UNITED STATES PATENT OFFICE.

HARAI R. LAYNG, OF SAN FRANCISCO, CALIFORNIA; HATTIE F. LAYNG ADMINISTRATRIX OF SAID HARAI R. LAYNG, DECEASED.

METHOD OF TREATING ORES BY VOLATILIZATION.

1,427,765. Specification of Letters Patent. Patented Aug. 29, 1922.

No Drawing. Application filed November 4, 1919. Serial No. 335,647.

*To all whom it may concern:*

Be it known that I, HARAI R. LAYNG, a citizen of the United States, residing in the city and county of San Francisco, and State of California, have invented new and useful Improvements in Methods of Treating Ores by Volatilization, of which the following is a specification.

My invention relates to the treatment of ores or other metal bearing compounds or mixtures which are hereinafter referred to as "ore," by means of volatilization methods and it is applicable to the treatment of any ore which will give up any of its valuable elements when subjected to treatment by any volatilization process, such as, for examples, volatilization processes for the recovery of antimony as an oxide from antimony ores, or such as the chloridizing volatilization processes for the treatment of gold, silver, copper, lead, zinc or like ores, in which processes the values are volatilized from the ore in the form of a chloride.

The attempts heretofore to conduct on a practical or commercial scale the volatilization process, other than my process, have been made with various types of furnaces and were made under conditions which would cause the ore to be heated slowly and gradually for the purpose of allowing the then supposed necessary time during which supposed preliminary chemical reactions were to have taken place and for the purpose of conserving heat. All or most all these attempts, with the exception above mentioned, have proven commercial failures, either because of poor extractions, unprofitable or unadvantageous commercial capacity of the furnaces or because of high cost. In the heretofore attempts to carry on the volatilization process on a commercial as well as in newly proposed attempts the practice was conducted and is proposed to be conducted along lines so as to economize heat by minimizing the difference in temperature between the gases leaving the furnace and the ore or mixture of ore and chemical entering it at the same place; and in such cases the ore would be in the furnace from one to two hours or more.

I have discovered that slow heating, such as has been done in the mentioned attempts, causes harmful chemical reactions to take place, prevents beneficial reactions from taking place, and also causes increased consumption of fuel and chemicals where chemicals are used, thereby causing low extractions or low impractical furnace capacity and generally unprofitable or unadvantageous results.

In a case of treating by volatilization methods a stibnite ore crushed to $1\frac{1}{4}$ in. ring and containing about 20% antimony, a revolving furnace approximately 24 ft. long by 38" diameter on the feed and flue end and 54" diameter on the discharge and fire end was employed. The temperature of the furnace gases was about 1100° C. at the fire end and about 300° C. at the flue end, the ore could only be fed at the rate of about three tons per day and the extraction of antimony which was caught as antimony trioxide was only about 50%. The ore remained in the furnace about $1\frac{1}{2}$ hours. In this case the slow heat caused a non-volatile tetraoxide to form and also caused considerable precipitation of oxide in the furnace which precipitated oxide reacted with the molten stibnite to form antimony glass which could not be easily volatilized and which clogged up the furnace to such a degree that it necessitated cleaning the furnace very often.

I discovered that by providing a means of heating the ore in the same furnace so rapidly as to prevent the harmful reactions from occurring that the extraction was increased to over 95% and the capacity of the furnace was more than doubled and the fuel consumption was not increased excessively. The temperature of the flue gas was increased to about 500° C. whilst the temperature at the discharge end was decreased to about 1,000° C.

In cases of chloridizing volatilization processes I also discovered that slow heating causes harmful chemical reactions to occur, prevents beneficial reactions from taking place and causes increased consumption of chemicals and fuel, thereby causing low extractions or low furnace capacity and generally unprofitable or unadvantageous results. Some of the harmful reactions which may occur are the formation of non-volatile or nearly non-volatile compounds, such as oxychlorides of the metal or metals, combinations of the metal with an alkali or alkaline earth base or with silica, such as sodium-plumbate compounds of lead alkali and silica; also the formation of fused compounds, such as, for example, sodium sulphate, which salts form a coating over the metal or mineral and thereby more or less preventing beneficial reactions from taking place.

In numerous cases without exception I have found, by quickly heating the mixture of ore and a chloride, such as, for example, sodium chloride, to such a degree as will prevent the harmful reactions from occurring and as will cause good rates of volatilization, that good, if not complete extractions were realized; that the chemical consumption will be reduced and that the furnace capacity increased without excessive fuel consumption, therefore accomplishing results which in practice would prove profitable or advantageous.

In the case of an ore composed mainly of calcium carbonate, ironoxide and silica, assaying about 11 oz. Ag 38/100%; S; 10% Pb, 7/10% Cu; 05 oz. Au and which was ground to pass a 10 mesh screen and mixed with sodium chloride, when heated in such a manner that about 30 minutes time was required to heat the ore to about 1650° F. and about another 20 minutes to bring it to 1800° Fah. then held at between 1800° Fah. and 1890° Fah. for about 80 minutes the extraction was only 50% of the lead and 38% of the silver. The charge was sampled every ten minutes and showed that the extraction progressed slowly after the first 30 minutes throughout the test. The same ore when subjected to same conditions, excepting time and heat, when heated to about 1650° Fah. in 20 minutes then to about 1800° Fah. in about 8 minutes, then held at between 1800° and 1890° for about 80 minutes the extraction was about 80% of silver and 62% of the lead; the extraction continuing after the first 20 minutes through the test. The same ore under same conditions, when heated to about 1650° Fah. in 15 minutes and to 1800° F. in another 10 minutes and held at from 1800° to 1890° Fah. for 80 minutes gave 85% of silver and 83% of the lead. The same ore, excepting that a chloride other than sodium chloride was used, when under otherwise similar conditions was heated in about 17 minutes to about 1650° Fah. then to about 1800° Fah. in about 5 minutes, then held between 1800° and 1890° F. for about 40 minutes gave 98% of the silver and 97% of the lead.

The same ore under same conditions as in the preceding test, when heated to about 1650° Fah. in about 3 minutes then to 1800° Fah. in about two additional minutes and held between 1800° and 1890° for thirteen minutes gave complete extraction of gold and 92% of the silver. The extraction progressing throughout the test and when the progressive extractions were plotted it was found that the extraction line almost paralleled the temperature curve, thus proving that the extractions can be obtained almost as quickly as the ore can be heated.

In conducting this process in practice the ore, such as a lead ore, for example, may be prepared in any suitable manner, by crushing or grinding, and by mixing with a chemical or chemicals, such as, sodium chloride (other chlorides, for instance, magnesium, or calcium chlorides or mixture of any two or more chlorides, may be used). This mixture may be preheated, if desired, provided it is not heated to such an extent as to cause harmful reactions to occur, and it may either with or without the preheating be fed to any suitable furnace which is properly heated, such as, a revolving furnace provided with a source of heat, such as, an oil burner, located sufficiently close to the point of feeding to enable the ore to be quickly heated and provided with such additional sources of heat as may be necessary to maintain the ore at any desired heat, for example, in the case of a long revolving furnace, an oil burner near the discharge end. Other furnaces may be used, such as shaft furnaces, rabble furnaces, or other types wherein provision can be made to heat the ore quickly. The treatment of the mixture in the properly heated furnace will cause chloride of lead to form which will, by means of the proper heat, be driven from the ore and mix with the other furnace gases which are conveyed from the furnace through a flue or other suitable means. The hot flue gases from the furnace can be utilized in any suitable or well known device to preheat the air used in the furnace or to dry or to preheat the ore or for any or all these purposes, thereby saving fuel. The gases either before or after or during their utilization as a preheating medium may be treated, if necessary, by any suitable means, such as settling chambers to remove ore dust. The gases are further cooled if necessary and treated by any suitable means, such as settling, filtration or absorption or electrostatic precipitation for the recovery of the condensed metallic chloride which in this case is lead chloride. The compound so recovered may then be treated as desired to recover the metal and the chloride or the chlorine or both, or it may be sold to a smelter or otherwise disposed of.

I wish it understood that the temperature and time may be varied to suit any particular ore and that the ore may be heated, if desired, before it is subjected to the quick heating provided the preliminary heat is not sufficient to cause harmful reactions to occur. The limit of the preheating temperature will vary according to the ore or chemical used.

The degree of heat, length of time and degree of preheating can easily be determined in laboratory tests.

It will be obvious to those skilled in the art to which the invention relates that modifications, such as exact location of the source of heat may be made in detail without departing from the spirit thereof.

1. The process of volatilizing elements from an ore or mixture which consists of heating the ore or mixture so rapidly as to prevent the occurrence of harmful reactions for the purpose of volatilizing the element or compounds thereof.

2. The process of volatilizing elements from an ore or mixture which consists of rapidly heating the ore or mixture to prevent the occurrence of harmful reactions and maintaining the ore or mixture at a suitable temperature to volatilize the elements or compound thereof.

3. The process of volatilizing elements from an ore or mixture which consists of preheating the ore to any point below the point of occurrence of harmful reactions, then rapidly heating the ore and maintaining the ore at suitable temperatures to volatilize the element or compound thereof.

4. The process of volatilizing elements from an ore or mixture which consists of suitably heating the ore or mixture, utilizing the heat of the gases resulting from such heating of the ore to preheat air or ore or both to volatilize the element or compound thereof.

5. A process of volatilizing ores which consists in raising the temperature of the ore to a volatilizing point with the greatest practical rapidity, then further increasing the temperature of the ore to a temperature slightly above the point of volatilization and retaining the ore at such temperature until volatilization of the values contained has taken place.

6. The process of chloridizing and volatilizing ores which consists in mixing an ore of suitable mesh with a chloridizing agent, then introducing and passing the mixed ore through a zone of high temperature where the mixture is rapidly raised to a volatilizing temperature, then gradually raising the temperature and maintaining it at a raised temperature until volatilization of the values contained has taken place.

7. The process of chloridizing and volatilizing ores which consists in mixing an ore of suitable mesh with a chloridizing agent, then introducing and passing the ore through a zone of high temperature where the ore is rapidly raised to an approximate temperature of 1650° Fah. then progressively raising the temperature from 1650° Fah. to 1800° Fah., and finally to approximately 1900° Fah., then holding the ore at this temperature until volatilization of the values contained has taken place.

8. A method of minimizing the dilatorious reaction occurring in the volatilization of ores which consist in decreasing to a minimum the time interval required to raise the temperature of the ore to a volatilizing point.

9. A chloridizing volatilization process for the treatment of gold, silver, copper, lead, zinc or like ores in which process the values are volatilized from the ore in the form of a chloride, which consists in mixing an ore of suitable mesh with a chloridizing agent, then introducing and passing the ore through a zone of high temperature where the ore is brought to the point of volatilization with the greatest practical rapidity, then further increasing the temperature of the ore and maintaining the ore at said increased temperature until the values are volatilized from the ore in the form of a chloride.

In testimony whereof I have hereunto set my hand in the presence of two subscribing witnesses.

HARAI R. LAYNG.

Witnesses:
WM. H. BAUER,
J. H. HERRING.